(12) United States Patent
Merritt (10) Patent No.: US 9,814,221 B2
(45) Date of Patent: Nov. 14, 2017

(54) COMBINATION SINKER AND BAIT STABILIZER

(71) Applicant: ANGLERS SELECT, LLC, Montville, NJ (US)

(72) Inventor: James Merritt, Whiteville, NC (US)

(73) Assignee: ANGLERS SELECT, LLC, Boonton, NJ (US)

(*) Notice: Subject to any disclaimer, the term of this patent is extended or adjusted under 35 U.S.C. 154(b) by 0 days.

(21) Appl. No.: 15/271,088

(22) Filed: Sep. 20, 2016

(65) Prior Publication Data

US 2017/0099819 A1 Apr. 13, 2017

Related U.S. Application Data

(63) Continuation-in-part of application No. 13/403,114, filed on Feb. 23, 2012, now abandoned, and a continuation-in-part of application No. 13/403,055, filed on Feb. 23, 2012.

(60) Provisional application No. 61/446,432, filed on Feb. 24, 2011, provisional application No. 61/446,422, filed on Feb. 24, 2011.

(51) Int. Cl.
*A01K 83/06* (2006.01)
*A01K 95/00* (2006.01)
*A01K 85/00* (2006.01)

(52) U.S. Cl.
CPC .............. *A01K 83/06* (2013.01); *A01K 85/00* (2013.01); *A01K 95/00* (2013.01)

(58) Field of Classification Search
CPC .......... A01K 83/06; A01K 95/00; A01K 85/00
USPC ....... 43/44.81, 43.1, 44.2, 44.8, 42.7, 42.39, 43/44.96; 114/294, 301
See application file for complete search history.

(56) References Cited

U.S. PATENT DOCUMENTS

| 637,169 | A | * | 11/1899 | Slotterbeck | ............ A01K 83/00 43/42.7 |
| 700,093 | A | * | 5/1902 | Seiler | ..................... A01K 83/00 43/42.7 |
| 772,333 | A | * | 10/1904 | Biersach | ................ A01K 83/00 24/374 |
| 787,806 | A | * | 4/1905 | Torgerson | .............. A01K 83/00 43/42.7 |

(Continued)

FOREIGN PATENT DOCUMENTS

| GB | 2078472 A | * | 1/1982 | ............. A01K 95/00 |
| GB | 2310121 A | * | 8/1997 | ............. A01K 95/00 |

(Continued)

*Primary Examiner* — Darren W Ark
(74) *Attorney, Agent, or Firm* — Sean R. Wilsusen (57) ABSTRACT

According to the principles of the present invention a combination sinker and bait stabilizer for a fishing hook is provided. The device is intended for use with a fishing hook having a curved shaft and a sharp tip extending from the curved shaft. The device includes an attachment portion including an eye adapted for receiving the curved shaft through the sharp tip and for lying on the curved shaft. The device further includes first and second capture members attached to the attachment portion and spaced apart from each other, the first and second capture members lying in a plane lateral to the plane of the fishing hook and extending upwardly to be inserted into a portion of a soft bait to maintain the soft bait laterally to the fishing hook.

16 Claims, 12 Drawing Sheets

(56) References Cited

U.S. PATENT DOCUMENTS

| | | | | |
|---|---|---|---|---|
| 913,102 A * | 2/1909 | Burke | A01K 85/02 | 43/35 |
| 1,118,439 A * | 11/1914 | Parker | A01K 83/00 | 43/42.7 |
| 1,152,698 A * | 9/1915 | Bonner | A01K 83/06 | 43/43.4 |
| 1,339,697 A * | 5/1920 | England | A01K 95/00 | 114/294 |
| 1,608,894 A * | 11/1926 | McGrain | A01K 83/00 | 43/42.7 |
| 1,776,967 A * | 9/1930 | Eckart | A01K 95/00 | 43/44.96 |
| 2,115,493 A * | 4/1938 | Kosten | A01K 83/06 | 43/44.8 |
| D118,869 S * | 2/1940 | Tower | | 43/44.96 |
| 2,239,889 A * | 4/1941 | Hobbs | B63B 21/30 | 114/294 |
| 2,281,809 A * | 5/1942 | Smith | A01K 85/14 | 43/42.17 |
| 2,492,557 A * | 12/1949 | Deimler | A01K 83/06 | 43/44.8 |
| 2,520,544 A * | 8/1950 | Hook | A01K 83/00 | 294/66.1 |
| 2,540,276 A * | 2/1951 | Moler | A01K 97/045 | 43/44.2 |
| 2,600,314 A * | 6/1952 | Miner | A01K 83/06 | 43/41 |
| 2,603,026 A * | 7/1952 | Duty | A01K 83/06 | 43/4 |
| 2,725,842 A * | 12/1955 | Norris | B63B 21/243 | 114/305 |
| 2,782,550 A * | 2/1957 | Breti | A01K 83/06 | 43/44.4 |
| 2,795,885 A * | 6/1957 | Imberti | A01K 83/06 | 43/44.4 |
| 2,821,046 A * | 1/1958 | Fisk | A01K 83/06 | 43/44.2 |
| 2,841,916 A * | 7/1958 | Ueda | A01K 95/00 | 114/294 |
| 2,922,247 A * | 1/1960 | Buss | A01K 83/00 | 43/44.8 |
| 2,980,050 A * | 4/1961 | Murray | B63B 21/243 | 114/298 |
| 3,017,716 A * | 1/1962 | Hawks | A01K 85/00 | 43/42.16 |
| 3,034,250 A * | 5/1962 | Laba | A01K 83/06 | 43/42.37 |
| 3,163,958 A * | 1/1965 | Quinn | A01K 83/06 | 43/42.06 |
| 3,181,265 A * | 5/1965 | Cook | A01K 95/00 | 43/42.36 |
| 3,372,508 A * | 3/1968 | Maglinger | A01K 83/06 | 43/43.15 |
| 3,377,734 A * | 4/1968 | Snow | A01K 85/16 | 43/42.39 |
| 3,465,466 A * | 9/1969 | Showalter | A01K 83/06 | 43/42.24 |
| 3,604,141 A * | 9/1971 | Spencer | A01K 95/00 | 43/43.1 |
| D223,551 S * | 5/1972 | Persinger | D12/215 | |
| 3,664,054 A * | 5/1972 | Pickering | A01K 91/02 | 43/19 |
| 3,735,523 A * | 5/1973 | Merrill | A01K 95/00 | 43/44.96 |
| 3,795,074 A * | 3/1974 | Mantel | A01K 83/06 | 43/37 |
| 3,863,383 A * | 2/1975 | Lore | A01K 83/06 | 43/41 |
| 3,999,325 A * | 12/1976 | Folker | A01K 83/00 | 43/42.7 |
| 3,999,326 A * | 12/1976 | Wolf | A01K 83/00 | 43/42.7 |
| 4,653,212 A * | 3/1987 | Pixton | A01K 85/00 | 43/42.39 |
| 4,679,348 A * | 7/1987 | Wimberley | A01M 23/245 | 114/301 |
| 4,785,758 A * | 11/1988 | Eichelberger, Sr. | B63B 21/46 | 114/301 |
| 4,888,911 A * | 12/1989 | Pritchard | A01K 95/00 | 43/44.96 |
| 5,038,513 A * | 8/1991 | Hardin | A01K 85/01 | 43/42.31 |
| 5,230,178 A * | 7/1993 | Dillard | A01K 83/06 | 43/44.8 |
| 5,274,947 A * | 1/1994 | Griffiths | A01K 83/06 | 43/44.2 |
| 5,335,443 A * | 8/1994 | Grigsby, Jr. | A01K 85/00 | 43/43.14 |
| 5,353,731 A * | 10/1994 | Richter | B63B 21/46 | 114/301 |
| 5,367,817 A * | 11/1994 | Clark | A01K 85/00 | 43/42.02 |
| 5,555,669 A * | 9/1996 | Fitzgerald | A01K 95/00 | 43/44.96 |
| 5,673,508 A * | 10/1997 | Snyder | A01K 85/00 | 43/42.37 |
| D394,239 S * | 5/1998 | Lee | D12/215 | |
| 5,901,494 A * | 5/1999 | Reed | A01K 95/00 | 43/42.38 |
| 6,895,711 B1 * | 5/2005 | Nakamichi | A01K 83/06 | 43/42.24 |
| 7,036,266 B2 * | 5/2006 | Falcon | A01K 85/00 | 43/44.81 |
| 7,185,457 B2 * | 3/2007 | Nichols | A01K 85/00 | 43/42.24 |
| 7,788,844 B1 * | 9/2010 | Ruzicka | A01K 91/04 | 43/54.1 |
| 7,877,923 B2 * | 2/2011 | Dudley | A01K 85/00 | 43/42.26 |
| 7,971,387 B2 * | 7/2011 | Huddleston | A01K 85/00 | 43/44.2 |
| 7,980,021 B2 * | 7/2011 | Siatkowski | A01K 83/06 | 43/44.8 |
| 8,037,636 B2 * | 10/2011 | Meyer | A01K 95/00 | 43/44.96 |
| D650,039 S * | 12/2011 | Farrell | D22/145 | |
| 8,087,200 B1 * | 1/2012 | Ferriss | A01K 83/00 | 43/42.22 |
| 8,272,342 B1 * | 9/2012 | Manuel, Jr. | B63B 21/20 | 114/230.25 |
| 8,550,518 B1 * | 10/2013 | Lucas | A01M 31/02 | 43/43.16 |
| 8,635,805 B1 * | 1/2014 | Schmunk | A01K 83/06 | 206/540 |
| 9,015,985 B2 * | 4/2015 | Pauley | A01K 95/005 | 43/43.1 |
| 9,253,966 B2 * | 2/2016 | Scholfield | A01K 85/01 | |
| 9,485,973 B2 * | 11/2016 | Burke | A01K 83/06 | |
| 9,510,579 B1 * | 12/2016 | Boyette | A01K 95/00 | |
| 2006/0191187 A1 * | 8/2006 | Falcon | A01K 85/00 | 43/44.81 |
| 2009/0094880 A1 * | 4/2009 | Gifford | A01K 91/065 | 43/43.1 |
| 2010/0325938 A1 * | 12/2010 | Gillihan | A01K 83/06 | 43/44.4 |
| 2011/0056115 A1 * | 3/2011 | Sebile | A01K 83/00 | 43/44.81 |
| 2012/0174468 A1 * | 7/2012 | Nakamichi | A01K 83/00 | 43/44.81 |
| 2012/0216442 A1 * | 8/2012 | Merritt | A01K 85/02 | 43/42.1 |
| 2014/0013647 A1 * | 1/2014 | Burke | A01K 83/06 | 43/4.5 |
| 2014/0259869 A1 * | 9/2014 | Scholfield | A01K 83/06 | 43/42.36 |

(56) References Cited

U.S. PATENT DOCUMENTS

| 2015/0191219 A1* | 7/2015 | Samuels | B63B 21/26 |
| | | | 114/294 |
| 2016/0330945 A1* | 11/2016 | Mosher | A01K 85/01 |

FOREIGN PATENT DOCUMENTS

| GB | 2338877 A | * | 1/2000 | A01K 95/005 |
| GB | 2373700 A | * | 10/2002 | A01K 83/06 |
| GB | 2378113 A | * | 2/2003 | A01K 97/04 |
| GB | 2388289 A | * | 11/2003 | A01K 83/06 |
| JP | 10004844 A | * | 1/1998 | |
| JP | 2004180658 A | * | 7/2004 | |
| JP | 2004201551 A | * | 7/2004 | |
| JP | 2006115747 A | * | 5/2006 | |
| JP | 2006325468 A | * | 12/2006 | |
| JP | 2007129999 A | * | 5/2007 | |
| JP | 2010263881 A | * | 11/2010 | |

\* cited by examiner

COMBINATION SINKER AND BAIT STABILIZER

CROSS-REFERENCE TO RELATED APPLICATION

This application is a continuation in part of U.S. patent application Ser. No. 13/403,114, filed on Feb. 23, 2012, which claims the benefit of U.S. Provisional Application No. 61/446,432, filed Feb. 24, 2011; and this application is a continuation in part of U.S. patent application Ser. No. 13/403,055, filed Feb. 23, 2012, which claims the benefit of U.S. Provisional Application No. 61/446,422, filed Feb. 24, 2011, the disclosures of which are incorporated by reference herein in their entireties.

TECHNICAL FIELD

Exemplary embodiments of the present invention relate to a combination sinker and bait stabilizer for a fishing hook.

BACKGROUND

"Wacky style" fishing is a technique wherein the hook is attached to the center of a plastic bait (worm) such that the worm will flop around while the hook is in the water. While fishing a "wacky style" technique, a weight is typically not used, but instead the weight of the bait itself (infused with salt) and the hook causes the bait to sink.

Fishing a "wacky style" technique in deeper water becomes a problem because of the time it takes for the bait to sink to the bottom of the water. Also, the worm has a tendency to rotate relative to the plane of the hook when fishing a "wacky style" technique, especially if the bait is dropped over vegetation or other obstacles. If the plastic bait is oriented parallel to the plane of the hook, this reduces the chances of catching a fish because most fish will attack the bait from a perpendicular direction. The present invention provides a solution to the above problems.

SUMMARY

According to an exemplary embodiment of the present invention a combination sinker and bait stabilizer for a fishing hook is provided. The device is intended for use with a fishing hook having a curved shaft and a sharp tip extending from the curved shaft. The device includes an attachment portion including an eye adapted for receiving the curved shaft through the sharp tip and for lying on the curved shaft. The device further includes first and second capture members attached to the attachment portion and spaced apart from each other, the first and second capture members lying in a plane lateral to the plane of the fishing hook and extending upwardly to be inserted into a portion of a soft bait to maintain the soft bait laterally to the fishing hook. The combination sinker and bait stabilizer has a predetermined weight of $\frac{1}{32}$ ounce or greater to facilitate sinking of the soft bait in water.

According to the principles of the present invention, a bait holder for a fishing hook is provided. The bait holder can be used with a fishing hook having an eye at a first end, a sharp tip at a second end, and a curved shaft connecting the first end with the second end. The bait holder includes an attachment portion, adapted to be inserted through the eye of the fishing hook for securely attaching to the fishing hook. The bait holder further includes a first hook extending from the attachment portion and being adapted to be inserted through a portion of a soft bait for securing the soft bait to the first end of the fishing hook during use.

According to an exemplary embodiment of the present invention, a fishing bait stabilizer includes a fishing weight. The fishing weight includes a first groove formed in a first side of the weight, a second groove formed in a second side of the weight opposite the first groove, and a hole disposed between the first groove and the second groove. The fishing bait stabilizer includes a continuously formed bait capture member. The continuously formed bait capture member is a cylindrical rod having a first end and a second end. The first end of the cylindrical rod faces in a first direction that is perpendicular to an upper surface of the fishing weight. A first portion of the cylindrical rod is disposed in the first groove. Second and third portions of the cylindrical rod project through the hole of the fishing weight and form a substantially circular attachment portion including an eye configured to receive a fishing hook. A fourth portion of the cylindrical rod is disposed in the second groove. The second end of the cylindrical rod faces in the first direction.

According to an exemplary embodiment of the present invention, at least one of the first and second ends of the cylindrical rod may be substantially flat along a second direction that is perpendicular to the first direction.

According to an exemplary embodiment of the present invention, the first and second ends of the cylindrical rod may be disposed on substantially a same plane as each other along a second direction that is perpendicular to the first direction.

According to an exemplary embodiment of the present invention, the plane on which the first and second ends of the cylindrical rod are disposed may be below a bottom surface of the attachment portion.

According to an exemplary embodiment of the present invention, the fishing weight may have a donut shape. The upper surface of the fishing weight may be flat and may extend along a second direction that is perpendicular to the first direction.

According to an exemplary embodiment of the present invention, the fishing weight may weigh at least $\frac{1}{32}$ of an ounce.

According to an exemplary embodiment of the present invention, a bottom surface of the fishing weight may be flat and may extend along a second direction that is perpendicular to the first direction.

According to an exemplary embodiment of the present invention, the cylindrical rod may include metal.

According to an exemplary embodiment of the present invention, the fishing weight may include tungsten.

According to an exemplary embodiment of the present invention, the fishing weight may include at least 97% tungsten.

According to an exemplary embodiment of the present invention, a fishing bait stabilizer includes a fishing weight. The fishing weight includes a first groove formed in a first side of the weight, a second groove formed in a second side of the weight opposite the first groove, and a hole disposed between the first groove and the second groove. The fishing weight includes at least 97% tungsten. A continuously formed bait capture member is a cylindrical rod having a first end and a second end. The cylindrical rod is metal. The first end of the cylindrical rod faces in a first direction that is perpendicular to an upper surface of the fishing weight. A first portion of the cylindrical rod is disposed in the first groove. Second and third portions of the cylindrical rod project through the hole of the fishing weight and form a substantially circular attachment portion including an eye configured to receive a fishing hook. A fourth portion of the cylindrical rod is disposed in the second groove. The second end of the cylindrical rod faces in the first direction.

According to an exemplary embodiment of the present invention, at least one of the first and second ends of the cylindrical rod may be substantially flat along a second direction that is perpendicular to the first direction.

According to an exemplary embodiment of the present invention, the first and second ends of the cylindrical rod may be disposed on substantially a same plane as each other along a second direction that is perpendicular to the first direction.

According to an exemplary embodiment of the present invention, the plane on which the first and second ends of the cylindrical rod are disposed may be below a bottom surface of the attachment portion.

According to an exemplary embodiment of the present invention, the fishing weight may be coated in a dark colored paint.

BRIEF DESCRIPTION OF THE DRAWINGS

The above and other features of the present invention will become more apparent by describing in detail exemplary embodiments thereof, with reference to the accompanying drawings in which.

DETAILED DESCRIPTION

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

Variations in the shapes and sizes of the metal components described herein may occur, such as during manufacturing and/or as a result of the inherent chemical properties of the metal components described herein.

The drawings show a combination sinker and bait stabilizer having an attachment portion including an eye for receiving a hook and having one or more capture members that secure the plastic bait in a fixed relationship relative to the plane of the hook. The fishing device of the present invention allows the fisherman to fish a "wacky style" technique while using a sinker weight and while keeping the plane of the hook perpendicular to the longitudinal axis of the bait.

FIGS. 1-4 illustrate a first embodiment of the present invention.

Figure 1:
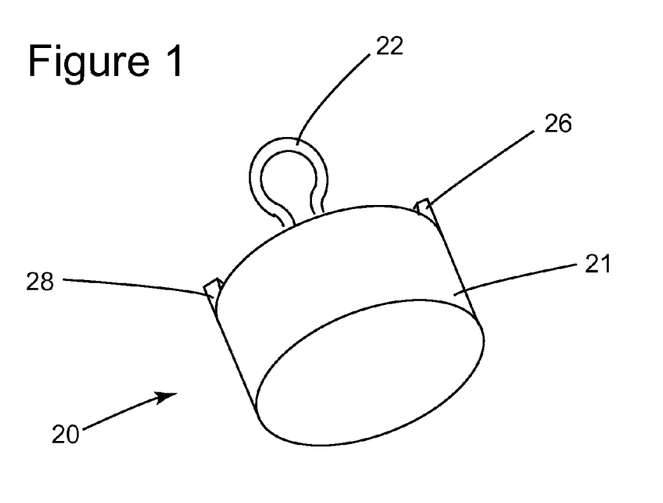
FIGS. 1-2 are perspective views of the combination sinker and bait stabilizer of the present invention.
Figure 2:
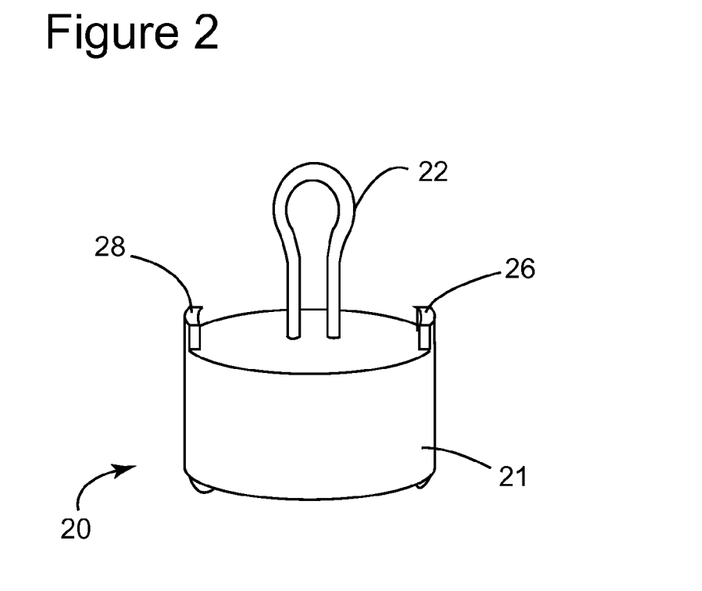

FIGS. 1-2 are perspective views of the combination sinker and bait stabilizer of the present invention. The device 20 includes a body portion 21 which can be hollow or solid and can be any shape, size and weight. The device 20 further includes an attachment portion 22 which forms an eye for receiving a hook (see FIG. 3). The device 20 further includes a first capture member 26 and a second capture member 28 spaced opposite from the first capture member. As shown, the capture members are formed as prongs. It should be understood, that any number of prongs can be used including one, two, three, four, or more. The capture members 26, 28 are attached to the attachment portion 22 and extend up past the top surface of the body portion 21.

As shown in the illustrated embodiment, the body portion 21 includes a planar upper surface. In one embodiment, the upper surface of the body portion 21 can include a longitudinal recess (not shown) for capturing the soft bait.

One or both of the capture members 26, 28 can extend orthogonally from the upper surface of the body portion. Each capture member can have the same height or different heights, as measured relative to the upper surface of the body portion 21. Preferably, each capture member has a height that is shorter than the total height of the attachment portion 22. The capture members 26, 28 are adapted to be inserted into the body of plastic bait (see FIG. 4) and as such can include sharp tips and/or barbs. As illustrated in FIG. 2, the eye of the attachment portion and the first and second capture members 26, 28 lie in the same plane. In other embodiments, the first and second capture members 26, 28 can lie in a plane that is offset from the plane of the eye of the attachment portion. In one embodiment, the attachment portion 22 and the first and second capture members 26, 28 are formed of a single piece of metal wire.

Figure 3:
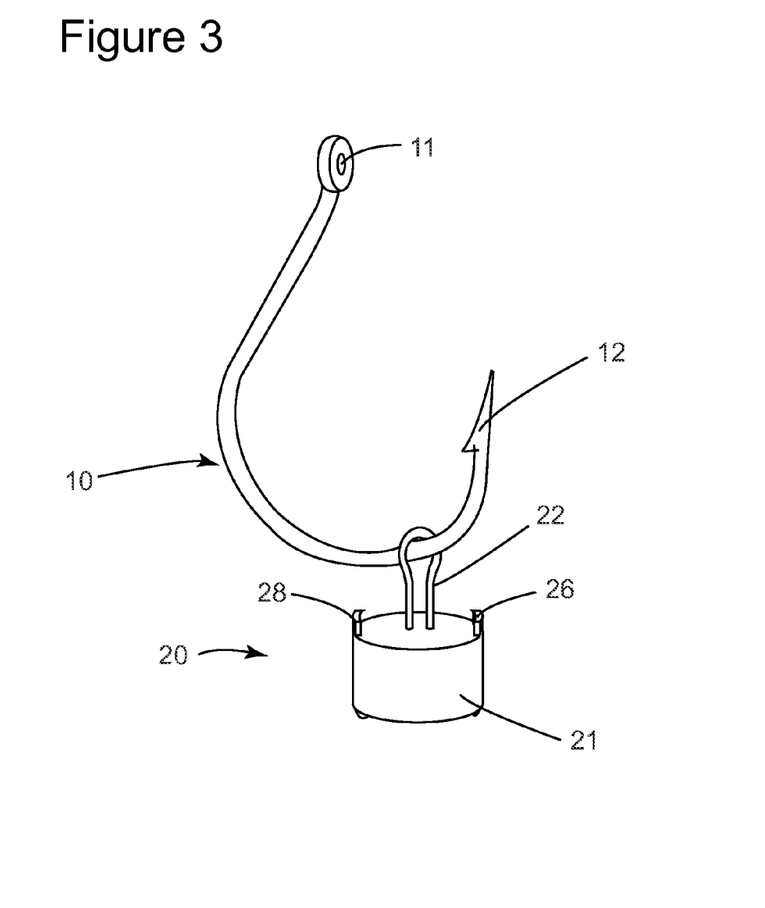
FIG. 3 is a side view of the device of FIG. 1 after the point of the hook has been inserted through the wire attachment.

FIG. 3 shows a fishing hook 10 for use with the device. The fishing hook 10 includes an eye 11 and a sharp point 12 that is adapted to be inserted through the wire attachment 22 of the weight 20. The fishing hook has a curved shaft.

Figure 4:
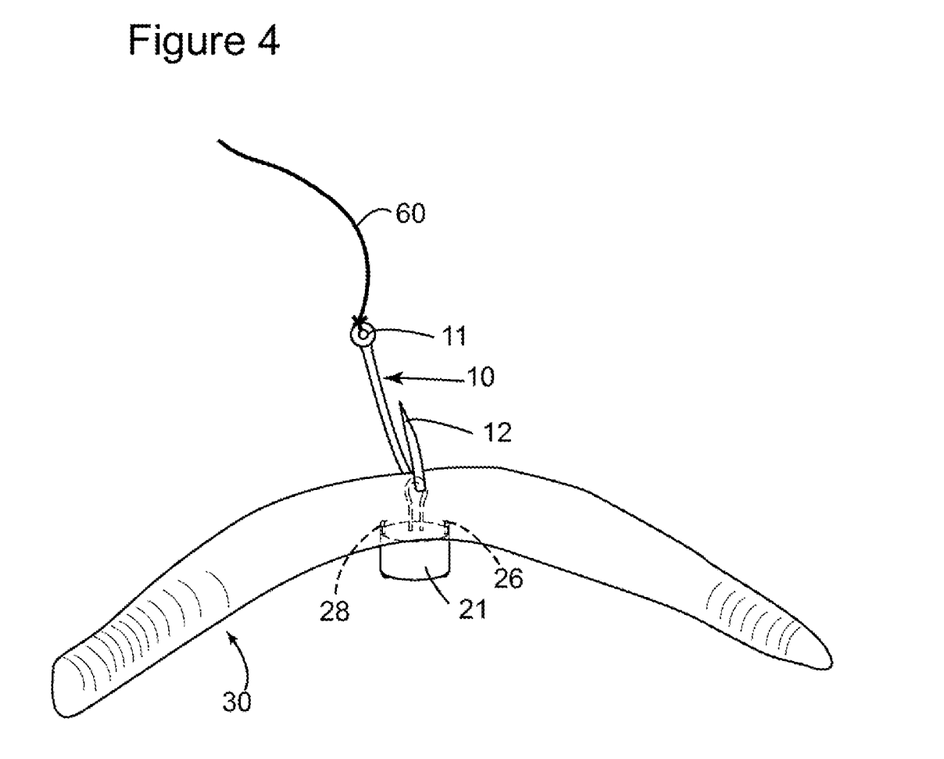
FIG. 4 is a perspective view of the device of FIG. 1, after it has been attached to the body of a soft plastic bait together with the hook.

FIG. 4 shows the method of attaching the assembly of FIG. 3 to a soft plastic bait 30. The soft plastic bait 30 can be any shape and size. First, the user can insert the attachment portion 22 into the body of the bait 30 and advance the eye of the attachment portion 22 through the body of the bait 30 until the first and second capture members 26, 28 are pierced into the body of the bait 30 as well. Next, the user can insert the sharp point 12 of the fishing hook through the surface of the bait 30, through the eye of the attachment portion 22, and out again through the surface of the bait 30. (If the user is not able to view the eye of the attachment portion 22, he can "feel" for its location before inserting the sharp point 12 of the hook through it.) Fishing line 60 is shown being attached to the eye 11 of the fishing hook.

The first and second capture members 26, 28 lie in a plane lateral to the plane of the fishing hook. The capture members 26, 28 extend upwardly to be inserted into a portion of the soft bait 30 to maintain the soft bait laterally to the fishing hook 10.

After the device 20 and fishing hook 10 are attached to the bait 30, the fisherman can drop the bait into deep water and the bait will sink towards the bottom while the bait stays in a fixed relationship relative to the plane of the hook.

The body portion 21 has a predetermined weight of at least 1/32 ounce. For example, the present invention can be sold in weight increments of 1/32, 1/16, 1/8, 3/16 ounce. In another embodiment, the body portion 21 is omitted and instead the attachment portion 22 and first and second capture members 26, 28 are formed of a single piece of metal wire that form a collective weight capable to sink the device in deep water.

Figure 5:
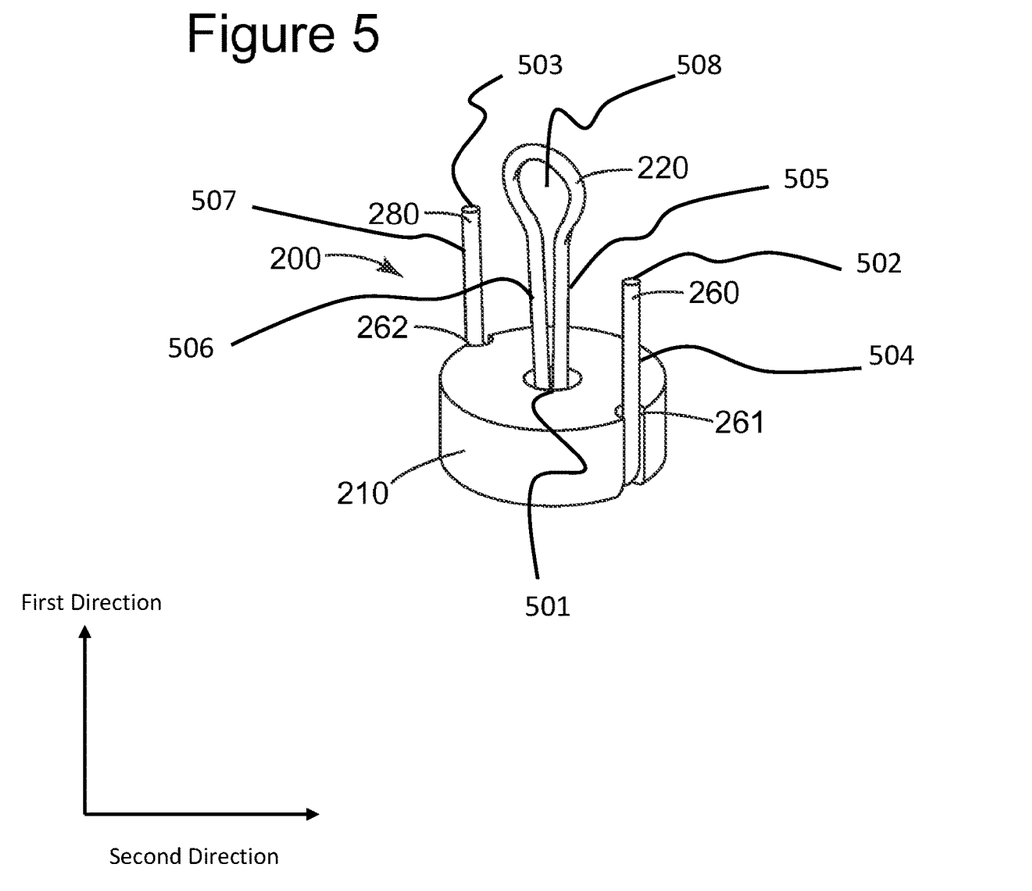
FIG. 5 is a perspective view of the combination sinker and bait stabilizer of the present invention according to another embodiment.

FIG. 5 is a perspective view of the combination sinker and bait stabilizer 200 of the present invention according to another embodiment. In this embodiment the body portion 210 is formed as a separate sinker weight having a through hole through which the attachment portion 220 is inserted. The body portion includes first and second grooves 261, 262 in side surfaces and the capture member 260, 280 is positioned in the grooves.

Referring to FIG. 5, according to an exemplary embodiment of the present invention, a fishing bait stabilizer includes the fishing weight 210. The fishing weight 210 includes the first groove 261 formed in a first side of the fishing weight 210, the second groove 262 formed in a second side of the fishing weight 210 opposite the first groove 261, and a hole 501 disposed between the first groove 261 and the second groove 262. The fishing bait stabilizer includes a continuously formed bait capture member (see, e.g., capture members 260, 280, which may be a continuously formed member). The continuously formed bait capture member is a cylindrical rod having a first end 502 and a second end 503. The first end 502 of the cylindrical rod faces in a first direction that is perpendicular to an upper surface of the fishing weight 210. A first portion 504 of the cylindrical rod is disposed in the first groove 261. Second and third portions 505 and 506 of the cylindrical rod project through the hole 501 of the fishing weight and form a substantially circular attachment portion 220 including an eye 508 configured to receive a fishing hook (see, e.g., fishing hook 10). A fourth portion 507 of the cylindrical rod is disposed in the second groove 262. The second end 503 of the cylindrical rod faces in the first direction.

The substantially circular attachment portion 220 including the eye 508 may project through a fishing bait (e.g., bait 30) from a bottom of the fishing bait to a top of the fishing bait to capture a fishing hook, while each of the first and second ends 502 and 503 of the fishing bait stabilizer remain buried in the fishing bait (i.e., do not protrude through the upper surface of the fishing bait.

According to an exemplary embodiment of the present invention, at least one of the first and second ends 502 and 503 of the cylindrical rod may be substantially flat along a second direction that is perpendicular to the first direction.

According to an exemplary embodiment of the present invention, the first and second ends of the cylindrical rod 502 and 503 may be disposed on substantially a same plane as each other along a second direction that is perpendicular to the first direction.

According to an exemplary embodiment of the present invention, the plane on which the first and second ends 502 and 503 of the cylindrical rod are disposed may be below a bottom surface of the attachment portion 220 (i.e., below a bottom of the eye 508. Thus, the eye 508 may project through a fishing bait (e.g., bait 30) from a bottom of the fishing bait through a top of the fishing bait to capture a fishing hook, while each of the first and second ends 502 and 503 of the fishing bait stabilizer remain buried in the fishing bait, and while the fishing weight 210 is suspended below a bottom surface of the fishing bait. Thus the upper surface of the fishing weight 210 may be in direct contact with a bottom surface of the fishing bait.

According to an exemplary embodiment of the present invention, the fishing weight 210 may have a donut shape. The upper surface of the fishing weight may be flat and may extend along a second direction that is perpendicular to the first direction.

According to an exemplary embodiment of the present invention, the fishing weight 210 may weigh at least 1/32 of an ounce.

According to an exemplary embodiment of the present invention, a bottom surface of the fishing weight 210 may be flat and may extend along a second direction that is perpendicular to the first direction.

According to an exemplary embodiment of the present invention, the cylindrical rod may include metal.

According to an exemplary embodiment of the present invention, the fishing weight may include tungsten.

According to an exemplary embodiment of the present invention, the fishing weight may include at least 97% tungsten.

According to an exemplary embodiment of the present invention, a fishing bait stabilizer includes the fishing weight 210. The fishing weight 200 includes the first groove 261 formed in a first side of the fishing weight 210, a second groove 262 formed in a second side of the fishing weight 210 opposite the first groove 261, and the hole 501 disposed between the first groove 261 and the second groove 2621. The fishing weight 210 includes at least 97% tungsten. A continuously formed bait capture member is a cylindrical rod having a first end and a second end. The cylindrical rod is metal. The first end of the cylindrical rod faces in a first direction that is perpendicular to an upper surface of the fishing weight. A first portion of the cylindrical rod is disposed in the first groove. Second and third portions of the rod project through the hole of the fishing weight and form a substantially circular attachment portion including an eye configured to receive a fishing hook. A fourth portion of the cylindrical rod is disposed in the second groove. The second end of the cylindrical rod faces in the first direction.

According to an exemplary embodiment of the present invention, the fishing weight 210 may include about 2.3% nickel or more. That is, the fishing weight 210 may include at least 97% tungsten, and a remainder of the fishing weight 210 may include nickel.

According to an exemplary embodiment of the present invention, at least one of the first and second ends 502 and 503 of the cylindrical rod may be substantially flat along a second direction that is perpendicular to the first direction.

According to an exemplary embodiment of the present invention, the plane on which the first and second ends 502 and 503 of the cylindrical rod are disposed may be below a bottom surface of the attachment portion 220.

According to an exemplary embodiment of the present invention, the fishing weight may be coated in a dark colored paint.

It will thus be seen from the preceding that the problems set forth above are solved in a particularly effective, simple, and inexpensive way, with a considerable advantage to the user.

It is to be understood that although the invention as presented can be used with any type of hook, any type of bait, and any type of fishing. The invention can be used to fish over any kind of structure, through weeds and grass, and at any depth you want, including fresh water and sea water.

The drawings show bait holder adapted for securing a fishing hook to a soft plastic bait while fishing a "weedless" technique during bass fishing. The bait holder of the present invention allows the fisherman to pull his bait through the thickest of vegetation without the top of the plastic bait sliding down the shaft of the fishing hook.

First Embodiment

Figure 6:
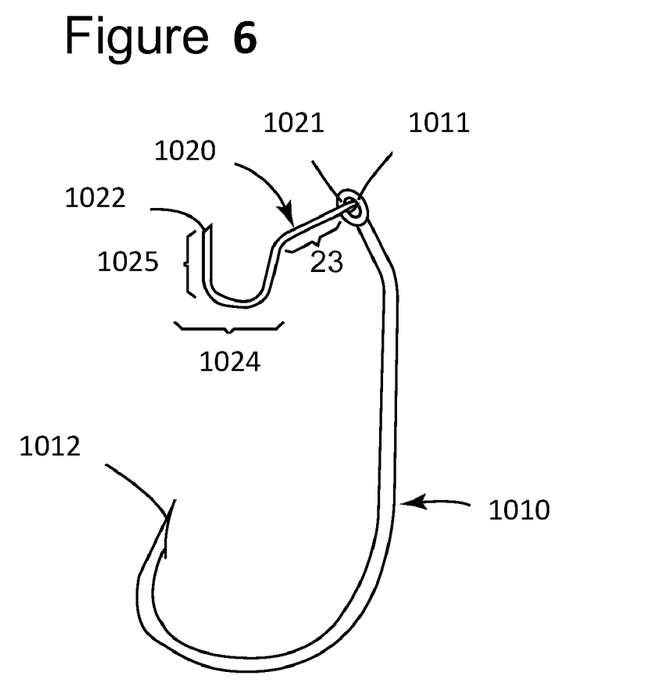
FIG. 6 is a top view of the first embodiment of the invention, showing a bait holder formed in the shape of a question mark attached to the eye of the hook.
Figure 7:
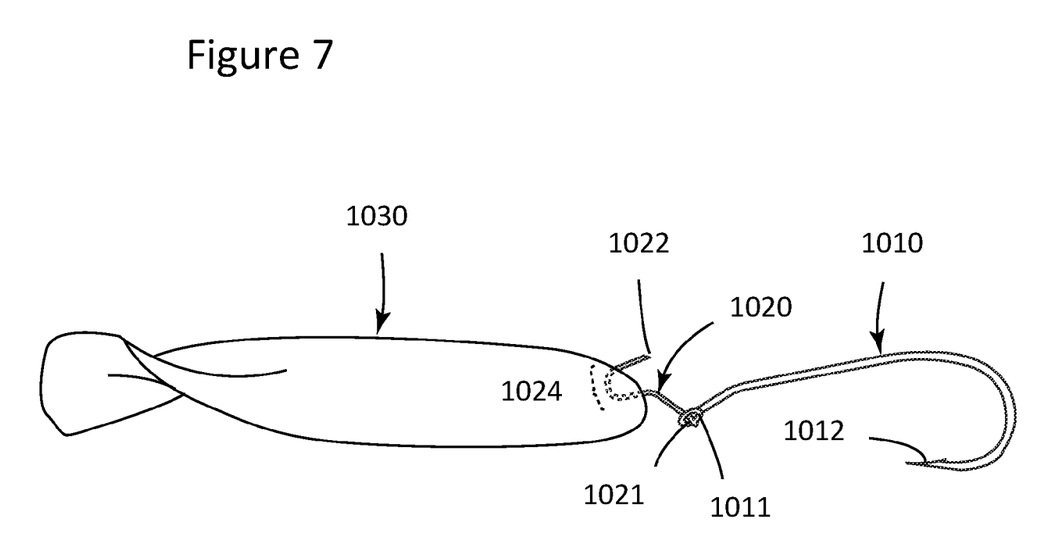
FIG. 7 is a top view of the bait holder of FIG. 6 after it has been attached to a head of a soft plastic bait.
Figure 8:
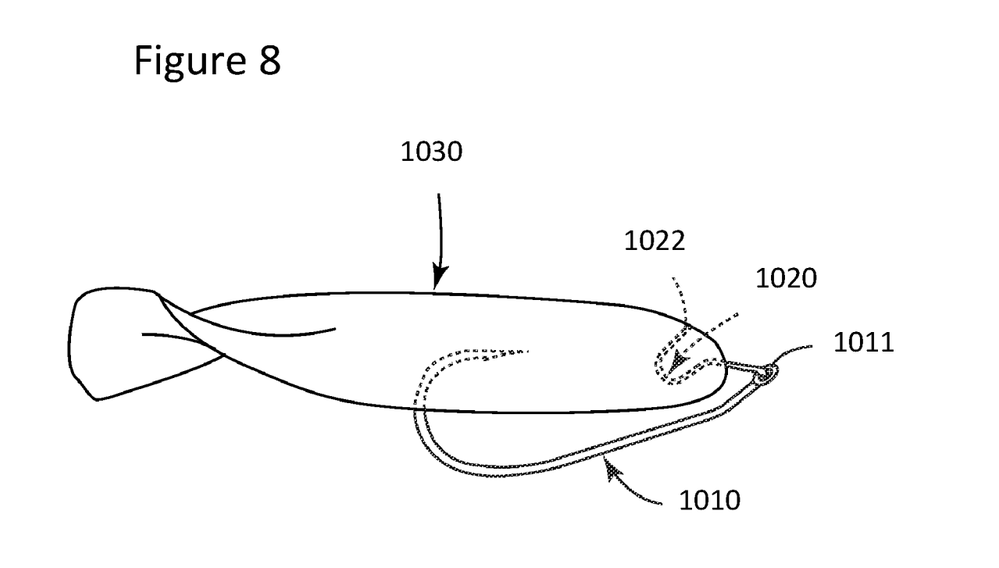
FIG. 8 is a top view of the bait holder of FIG. 6 after the sharp tip of the fishing hook has been attached to the body of the soft plastic bait.

FIGS. 6-8 illustrate a first embodiment of the present invention.

FIG. 6 shows a fishing hook 1010 having an eye 1011 at a first end, a sharp tip 1012 at a second end, and a curved shaft connecting the first end with the second end. A bait holder 1020 has a first end with an attachment portion 1021 formed as a loop and a first hook 1024 extending from the attachment portion 1021 which ends in a sharp tip 1022. The attachment portion 1021 of the bait holder is attached to the eye 1011 of the fishing hook by being inserted thereto. In one embodiment, the bait holder 1020 is attached to the fishing hook 1010 before the assembly is sold to the end-user. In another embodiment, the bait holder 1020 is sold separately from the fishing hook 1010 and is attached by the end-user.

In the bait holder 1020 illustrated by FIG. 6, a first shaft 1023 extends from the attachment portion 1021. A U-shaped hook 1024 extends from the first shaft 1023 and is adapted to be inserted through a portion of a soft bait (see FIGS. 7-8) for securing the soft bait to the first end 1011 of the fishing hook during use. The U-shaped hook 1024 includes a distal shaft 1025 having an angle of 90 degrees or less relative to the first shaft 1023.

The attachment portion 1021 of the bait holder 1020 is formed as a loop that lies in a first plane. The first hook 1024 lies in a second plane orthogonal to the first plane. Unlike most "off-the-shelf" fishing hooks known in the art, both the eye 1011 and curved shaft of the fishing hook 1010 lie in the same plane.

During manufacturing the bait holder can be formed into any predetermined shape. In the illustrated embodiment, the bait holder 1020 is formed as a single piece of wire which is formed into the shape of a question mark. The bait holder 1020 can include any predetermined shape having at least one rounded corner, at least one square corner, or a combination of at least one rounded corner and at least one square corner. In another embodiment, the bait holder can be J-shaped.

The bait holder 1020 can be formed into any three dimensional shape. However, in the illustrated embodiment, the first hook 1024 lies in a single plane and the attachment portion 1021 lies in a plane orthogonal to the single plane.

FIGS. 7-8 show the method of attaching the assembly of FIG. 6 to a soft plastic bait 1030. The soft plastic bait 1030 can be any shape and size. Referring to FIG. 7, the user can attach the first hook 1024 of the bait holder 1020 to a head of the soft plastic bait 1030 by piercing the bait with the sharp tip 1022. Referring to FIG. 8, next the user can insert the sharp tip of the fishing hook 1010 into the body of the soft plastic bait 1030 to fish a "weedless" technique.

Second Embodiment

FIGS. 9-12 illustrate a second embodiment of the present invention.

Figure 9:
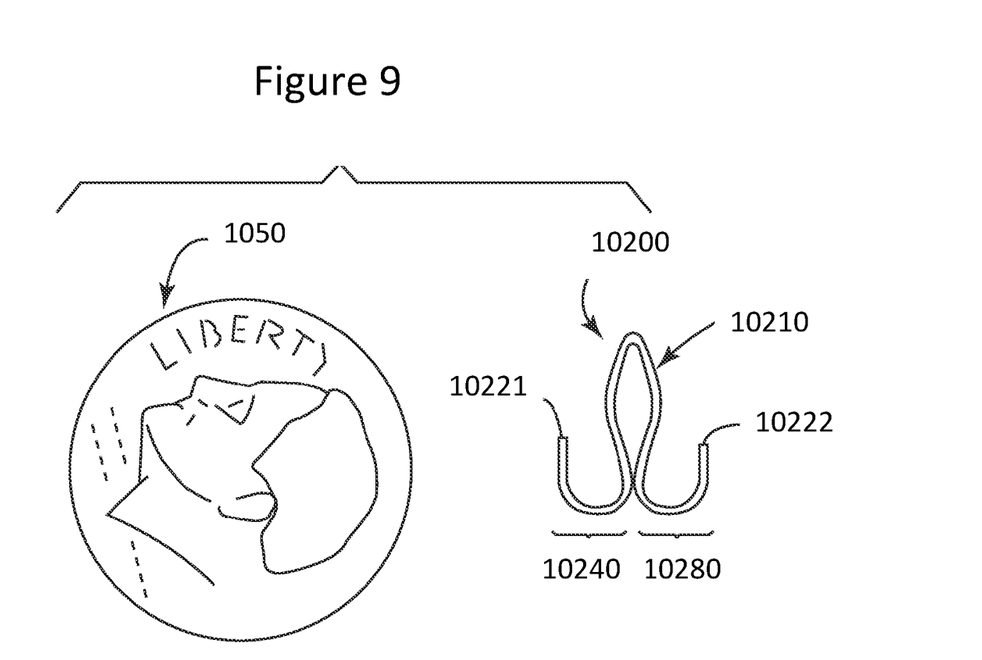
FIG. 9 is a top view of the second embodiment of the invention, showing a bait holder formed having a W-shape placed next to a dime.

FIG. 9 shows the bait holder 10200 of the second embodiment placed next to a dime 50 to show scale. The bait holder 10200 can be formed by bending a wire into a predetermined shape. The material of the wire can be a memory-shape material. The bait holder includes an attachment portion 10210 that is generally diamond-shaped. The attachment portion 10210 is preferably positioned near a mid portion of the bait holder 10200 during use. A first hook 10240 and a second hook 10280 extend from the attachment portion 10210, respectively. In the illustrated embodiment, the first hook 10240 is symmetrically arranged with the second hook 10280. The wire forming the bait holder 10200 can include two ends that have a sharp tip 10221, 10222.

The bait holder 10200 can include any predetermined shape having at least one rounded corner, at least one square corner, or a combination of at least one rounded corner and at least one square corner. The bait holder 10200 shown in FIG. 9 can be considered to generally be W-shaped, wherein portions of the lower apexes of the W shape are closely spaced to each other to form a substantially closed loop. The height of each of the first and second hooks 10240, 10280 of the bait holder 10200 is shorter than the total height of the bait holder.

The bait holder 10200 can include any predetermined shape having at least one rounded corner, at least one square corner, or a combination of at least one rounded corner and at least one square corner.

The bait holder 10200 can be formed into any three dimensional shape. However, in the illustrated embodiment, the bait holder lies in a single plane.

Figure 10:
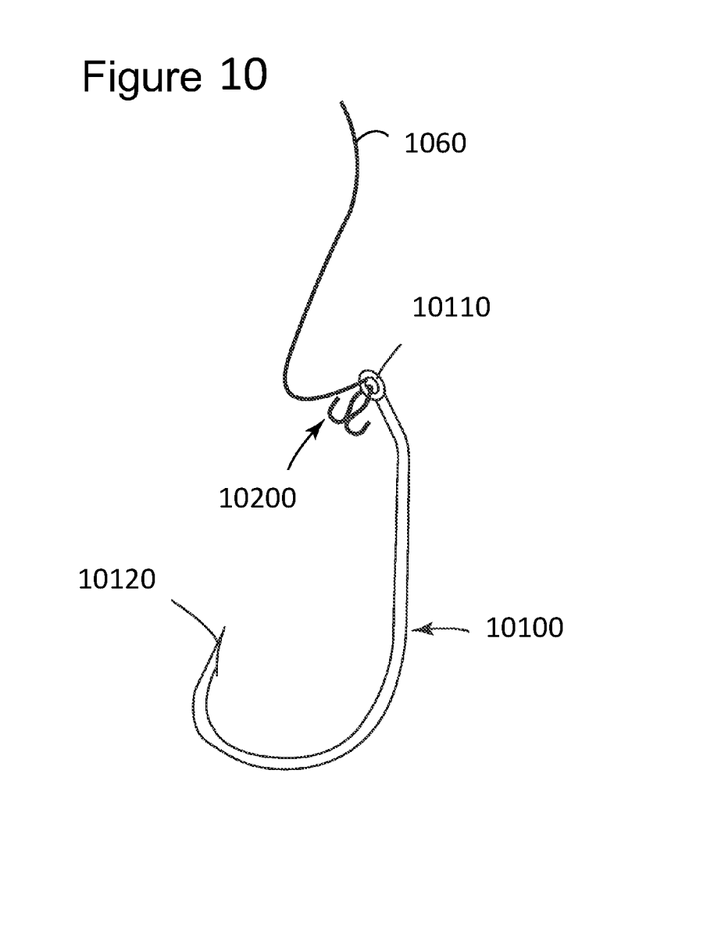
FIG. 10 is a top view of the bait holder of FIG. 9, after it has been attached to the eye of the fishing hook.
Figure 11:
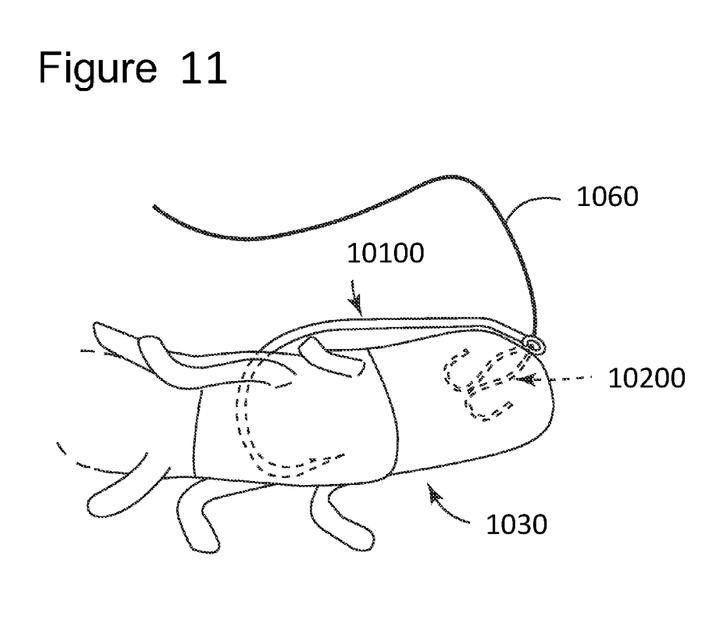
FIG. 11 is a top view of the bait holder of FIG. 9 according to a first method of use, after it has been attached to a head of a soft plastic bait and after the sharp tip of the fishing hook has been attached to the body of the soft plastic bait.

FIGS. 10-11 show a method of attaching the bait holder 10200 a soft plastic bait 10300. FIG. 10 shows a fishing hook 10100 having an eye 10110 at a first end, a sharp tip 10120 at a second end, and a curved shaft connecting the first end with the second end. The bait holder 10200 is attached to the eye 10110 of the fishing hook by inserting one end of the wire. In one embodiment, the bait holder 10200 is attached to the fishing hook 10100 before the assembly is sold to the end-user. In another embodiment, the bait holder 10200 is sold separately from the fishing hook 10100 and is attached by the end-user. The fishing line 1060 is shown in FIG. 10 being attached to the eye 10110 of the fishing hook. The soft plastic bait 1030 can be any shape and size. Referring to FIG. 11, the user can attach the bait holder 10200 to a head of the soft plastic bait 1030 by piercing the bait with one of the sharp ends. Next, the user can insert the sharp tip of the fishing hook 10100 into the body of the soft plastic bait 1030 to fish a "weedless" technique.

Figure 12:
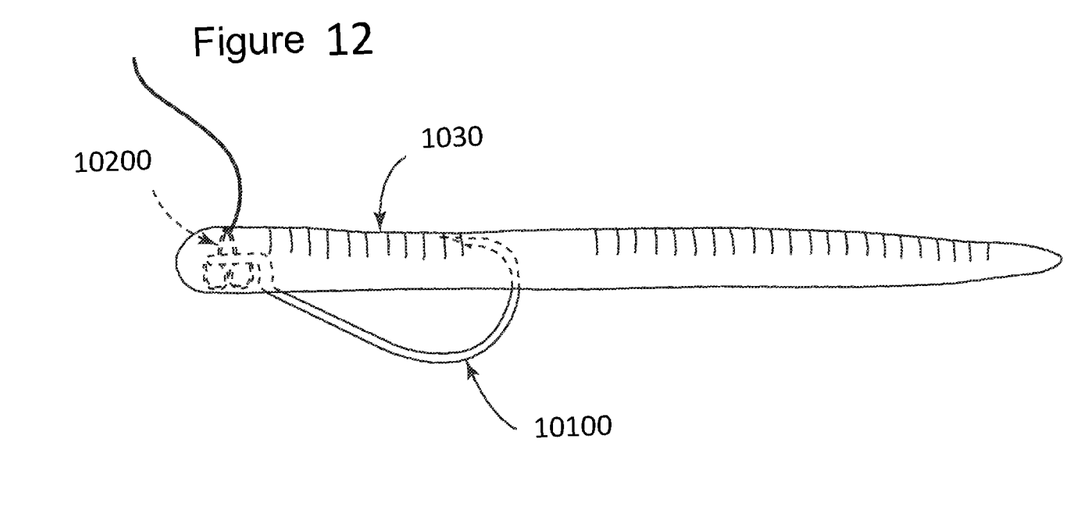
FIG. 12 is a top view of the bait holder of FIG. 9 according to a second method of use, after it has been attached to a head of a soft plastic bait and after the sharp tip of the fishing hook has been attached to the body of the soft plastic bait.

FIG. 12 shows another method of attaching the bait holder 10200 to the fishing hook 10100. The diamond-shaped attachment portion 10210 is adapted to be compressed to be inserted through the eye of the fishing hook.

It will thus be seen from the preceding that the problem set forth above is solved in a particularly effective, simple, and inexpensive way, with a considerable advantage to the user.

It is to be understood that although the invention as presented can be used with any type of hook, any type of bait, and any type of fishing. The invention can be used to fish over any kind of structure, through weeds and grass, and at any depth you want, including fresh water and sea water.

The above disclosure is intended to be illustrative and not exhaustive. This description will suggest many modifications, variations, and alternatives may be made by ordinary skill in this art without departing from the scope of the invention. Those familiar with the art may recognize other equivalents to the specific embodiments described herein. Accordingly, the scope of the invention is not limited to the foregoing specification. While the present invention has been particularly shown and described with reference to exemplary embodiments thereof, it will be understood by those of ordinary skill in the art that various changes in form and detail may be made therein without departing from the spirit and scope of the present invention.

What is claimed is:

1. A fishing bait stabilizer, comprising;
a fishing weight, wherein the fishing weight comprises a first groove formed in a first side of the fishing weight, a second groove formed in a second side of the fishing weight opposite the first groove, and a hole disposed between the first groove and the second groove; and
a continuously formed bait capture member,
wherein the continuously formed bait capture member is a cylindrical rod having a first end and a second end,
wherein the first end of the cylindrical rod faces in a first direction that is perpendicular to an upper surface of the fishing weight,
wherein a first portion of the cylindrical rod is disposed in the first groove,
wherein second and third portions of the cylindrical rod project through the hole of the fishing weight and form a substantially circular attachment portion comprising an eye configured to receive a fishing hook,
wherein a fourth portion of the cylindrical rod is disposed in the second groove,
wherein the second end of the cylindrical rod faces in the first direction, and
wherein at least one of the first and second ends of the cylindrical rod is substantially flat along a second direction that is perpendicular to the first direction.

2. The fishing bait stabilizer of claim 1, wherein the first and second ends of the cylindrical rod are disposed on substantially a same plane as each other along the second direction that is perpendicular to the first direction.

3. The fishing bait stabilizer of claim 2, wherein the plane on which the first and second ends of the cylindrical rod are disposed is below a bottom surface of the attachment portion.

4. The fishing bait stabilizer of claim 3, wherein the fishing weight has a donut shape, and wherein the upper surface of the fishing weight is flat and extends along the second direction that is perpendicular to the first direction.

5. The fishing bait stabilizer of claim 4, wherein the fishing weight weighs at least 1/32 of an ounce.

6. The fishing bait stabilizer of claim 4, wherein a bottom surface of the fishing weight is flat and extends along the second direction that is perpendicular to the first direction.

7. The fishing bait stabilizer of claim 1, wherein the cylindrical rod comprises metal.

8. The fishing bait stabilizer of claim 7, wherein the fishing weight comprises tungsten.

9. The fishing bait stabilizer of claim 8, wherein the fishing weight comprises at least 97% tungsten.

10. A fishing bait stabilizer, comprising;
a fishing weight, wherein the fishing weight comprises a first groove formed in a first side of the weight, a second groove formed in a second side of the weight opposite the first groove, and a hole disposed between the first groove and the second groove, wherein the fishing weight comprises at least 97% tungsten; and
a continuously formed bait capture member,
wherein the continuously formed bait capture member is a cylindrical rod having a first end and a second end,
wherein the cylindrical rod is metal,
wherein the first end of the cylindrical rod faces in a first direction that is perpendicular to an upper surface of the fishing weight,
wherein a first portion of the cylindrical rod is disposed in the first groove,
wherein second and third portions of the cylindrical rod project through the hole of the fishing weight and form a substantially circular attachment portion comprising an eye configured to receive a fishing hook,
wherein a fourth portion of the cylindrical rod is disposed in the second groove,
wherein the second end of the cylindrical rod faces in the first direction, and
wherein at least one of the first and second ends of the cylindrical rod is substantially flat along a second direction that is perpendicular to the first direction.

11. The fishing bait stabilizer of claim 10, wherein the first and second ends of the cylindrical rod are disposed on substantially a same plane as each other along the second direction that is perpendicular to the first direction.

12. The fishing bait stabilizer of claim 11, wherein the plane on which the first and second ends of the cylindrical rod are disposed is below a bottom surface of the attachment portion.

13. The fishing bait stabilizer of claim 12, wherein the fishing weight has a donut shape, and wherein the upper surface of the fishing weight is flat and extends along the second direction that is perpendicular to the first direction.

14. The fishing bait stabilizer of claim 13, wherein the fishing weight weights at least 1/32 of an ounce.

15. The fishing bait stabilizer of claim 13, wherein a bottom surface of the fishing weight is flat and extends along the second direction that is perpendicular to the first direction.

16. The fishing bait stabilizer of claim 10, wherein the fishing weight is coated in a dark colored paint.

* * * * *